(12) United States Patent
Yoo

(10) Patent No.: US 7,529,063 B2
(45) Date of Patent: May 5, 2009

(54) BEARING SUPPORT FOR A SPINDLE MOTOR OF A DISK DRIVE

(75) Inventor: Jin-gyoo Yoo, Gyeonggi-do (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 314 days.

(21) Appl. No.: 10/847,579

(22) Filed: May 18, 2004

(65) Prior Publication Data
US 2005/0152062 A1    Jul. 14, 2005

(30) Foreign Application Priority Data
Jan. 14, 2004    (KR)    .............. 10-2004-0002665

(51) Int. Cl.
G11B 17/02    (2006.01)
H02K 5/16    (2006.01)

(52) U.S. Cl. ............... 360/99.08; 310/90; 310/67 R

(58) Field of Classification Search .......... 360/99.08; 310/90, 67 R
See application file for complete search history.

(56) References Cited

U.S. PATENT DOCUMENTS

| | | | | |
|---|---|---|---|---|
| 5,283,491 A | * | 2/1994 | Jabbar et al. | ............... 310/90 |
| 5,516,212 A | * | 5/1996 | Titcomb | ............... 384/107 |
| 5,820,273 A | * | 10/1998 | Obara | ............... 384/613 |
| 5,834,868 A | * | 11/1998 | Yoshikawa et al. | ........ 310/67 R |
| 6,130,802 A | * | 10/2000 | Rahman et al. | ........ 360/99.08 |
| 6,439,774 B1 | | 8/2002 | Knepper et al. | |
| 6,771,459 B1 | * | 8/2004 | Komura et al. | ........ 360/99.08 |
| 6,787,954 B2 | | 9/2004 | Yoshitsugu et al. | |
| 6,936,944 B2 | * | 8/2005 | Kim | ............... 310/90 |
| 2002/0154840 A1 | | 10/2002 | Sugiyama et al. | |
| 2004/0070298 A1 | | 4/2004 | Aiello et al. | |

FOREIGN PATENT DOCUMENTS

| | | |
|---|---|---|
| CN | 1387296 A | 12/2002 |
| EP | 1 136 710 A1 | 9/2001 |
| JP | 1-134214 | 9/1989 |
| JP | 02-304214 | 12/1990 |
| JP | 1992-008915 | 1/1992 |
| JP | 04-119220 | 4/1992 |
| JP | 2001-027226 A | 1/2001 |

(Continued)

OTHER PUBLICATIONS

Partial English translation of JP 2001027226; Iwaki et al; publication date Jan. 30, 2001.*
Official Action issued by the Chinese Patent Office in corresponding CN Application No. 200410049265.7 on Sep. 29, 2006, and English-language version thereof.

(Continued)

*Primary Examiner*—Brian E Miller
(74) *Attorney, Agent, or Firm*—Buchanan Ingersoll & Rooney PC

(57) ABSTRACT

Provided is a spindle motor for a disk drive including a base, a sleeve fixed on the base and having a space portion therein, and a shaft rotatably installed in the space portion of the sleeve and having a shape such that a diameter of the shaft decreases from a middle portion of the shaft in a lengthwise direction to both ends thereof.

19 Claims, 15 Drawing Sheets

FOREIGN PATENT DOCUMENTS

| | | | |
|---|---|---|---|
| JP | 2002295460 A | * | 10/2002 |
| JP | 2003-222124 | | 8/2003 |
| JP | 2003269445 A | * | 9/2003 |
| KR | 1999-0041454 | | 8/1998 |
| KR | 1999-0070004 | | 9/1999 |

OTHER PUBLICATIONS

Notice of Office Action from the Japanese Patent Office issued on Aug. 5, 2008, in corresponding Japanese Patent Application 2005-003330.

* cited by examiner

30a

32a

30b

32b

BEARING SUPPORT FOR A SPINDLE MOTOR OF A DISK DRIVE

BACKGROUND OF THE INVENTION

This application claims the priority of Korean Patent Application No. 2004-2665, filed on Jan. 14, 2004, in the Korean Intellectual Property Office, the disclosure of which is incorporated herein in its entirety by reference.

1. Field of the Invention

The present invention relates to a spindle motor for a disk drive, and more particularly, to a spindle motor for a disk drive having a bearing to support a rotating body in both axial and radial directions in a non-contact manner using aerodynamic pressure.

2. Description of the Related Art

Spindle motors are widely used as a motor for laser beam scanners of laser printers, hard disk drives (HDDs), or optical disk drives using compact discs (CDs) or digital versatile discs (DVDs). The hard disk drive which is one of auxiliary storage devices for computers reproduces information stored on a magnetic disk or records information on the magnetic disk using a magnetic head. The hard disk drives are being developed to keep pace with recent demands for a higher speed, a higher capacity, and a lower vibration. To meet such demands, various researches and developments are under way. In particular, for the high speed and low vibration, studies on a hydrodynamic bearing supporting a rotating body of a spindle motor in a non-contact manner is widely made. Furthermore, studies to adopt a hydrodynamic bearing which reduces a friction force and a starting torque and minimizes a change in the characteristic of a bearing according to a temperature, to hard disk drives for mobile use or an ultrahigh speed use, are made.

In general, a bearing system is composed of a radial bearing to support a load in a radial direction and a thrust bearing to support the load in an axial direction. To reduce vibration of a rotating body a relative position between the radial bearing and the thrust bearing is important. That is, when the radial bearing and the thrust bearing are separated from each other, the relative position between the two bearings needs to be processed to be within a desirable allowance.

FIG. 1 shows a conventional spindle motor adopting a hydrodynamic bearing. Referring to FIG. 1, the spindle motor includes a base 11 and a sleeve 13. A shaft 15 is fixed at a center portion of the base 11. A center hole, in which the shaft 15 is inserted, is formed in the sleeve 13. A coil 12 is provided on the base 11 to generate an electromagnetic force. A magnet 14 corresponding to the coil 12 is provided on the sleeve 13. A bearing gap is formed between an outer circumferential surface of the shaft 15 and an inner circumferential surface of the sleeve 13. The bearing gap is filled with a fluid such as lubricant or grease.

A plurality of grooves 20 are formed on the inner circumferential surface of the sleeve 13 in a herringbone pattern. The grooves 20 generate a hydrodynamic pressure during rotation of the sleeve 13 to support the sleeve 13 in a radial direction of the shaft 15. The grooves 20 are formed in upper and lower portions of the inner circumferential surface of the sleeve 13.

Although not shown in the drawing, a plurality of grooves are formed on the inner circumferential surfaces of the sleeve 13 facing upper and lower surfaces of a flange 25 formed in the upper portion of the shaft 15. These grooves also supports the sleeve 13 in the axial direction of the shaft 15 by generating a hydrodynamic pressure during the rotation of the sleeve 13.

When the spindle motor is adopted to a hard disk drive, the structure of the hard disk drive is complicated due to a sealing design to prevent leakage of the fluid used in the bearing. Also, a power consumption and a starting torque increase due to a friction loss by a viscous frictional force. Further, since the viscosity of the fluid used in the hydrodynamic bearing is considerably changed by heat, the characteristic of the bearing changes greatly according to the heat, which makes the characteristic of the hard disk drive unstable with respect to the heat. Actually, the temperature inside the hard disk drive rises from a room temperature up to 80° C. by the heat generated during operation of the hard disk drive. In contrast, at a low temperature, since the viscosity of the fluid increases, a starting torque needed for the motor is not generated so that the motor may not start.

The spindle motor uses a radial bearing and a thrust bearing to support loads in a radial direction and an axial direction, respectively. In this case, for a highly accurate rotation, the relative position between the radial bearing and the thrust bearing need to be accurately set. However, such setting requires a lots of time for processing and assembly so that productivity is lowered.

A bearing structure to solve the above problem is shown in FIG. 2. FIG. 3 is an exploded view of the bearing structure of FIG. 2. FIGS. 4A through 4C are view to explain an assembly process of the bearing structure of FIG. 2.

Referring to FIG. 2, a bearing structure includes a rotation shaft 30 having upper and lower conic shafts 30a and 30b and sleeves 32a and 32b encompassing a side surface and a lower surface of the rotation shaft 30. The diameter of a section of the rotation shaft 30 increases from the middle portion of the rotation shaft 30 in the lengthwise direction to the opposite ends thereof. The bearing structure having the above structure has a merit of simultaneously supporting the loads in the radial and axial directions. However, to assembly the above bearing structure, as shown in FIG. 3, a sleeve 32 needs to be processed to be at least two parts 32a and 32b and the rotation shaft 30 needs to be at least two parts 30a and 30b. In the assembly process, as shown in FIGS. 4A through 4C, since at least three steps are needed for the assembly process, process and assembly of the bearing structure has problems.

SUMMARY OF THE INVENTION

To solve the above and/or other problems, the present invention provides a spindle motor for a disk drive having a bearing which can support a rotating body in a non-contact manner simultaneously in an axial direction and a radial direction by using aerodynamic pressure.

According to an aspect of the present invention, a spindle motor for a disk drive comprises a base, a sleeve fixed on the base and having a space portion therein, and a shaft rotatably installed in the space portion of the sleeve and having a shape such that a diameter of the shaft decreases from a middle portion of the shaft in a lengthwise direction to both ends thereof.

The shaft is formed by coupling first and second conic shafts having conic inclined surfaces and the shaft is integrally formed.

The sleeve comprises a first sleeve where a first space portion having a shape corresponding to the first conic shaft and a second sleeve where a second space portion having a shape corresponding to the second conic shaft.

A bearing gap generated between an outer circumferential surface of the shaft and an inner circumferential surface of the sleeve is filled with air.

A plurality of grooves in a herringbone pattern are formed in an outer circumferential surface of the shaft or an inner circumferential surface of the sleeve. A sectional shape of each of the grooves is rectangular. A sectional shape of each of the grooves is taper-flat such that one side surface is inclined from a lower surface portion.

The sleeve is formed of ceramic which is alumina or zirconia.

The shaft is formed of ceramic which is alumina or zirconia.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
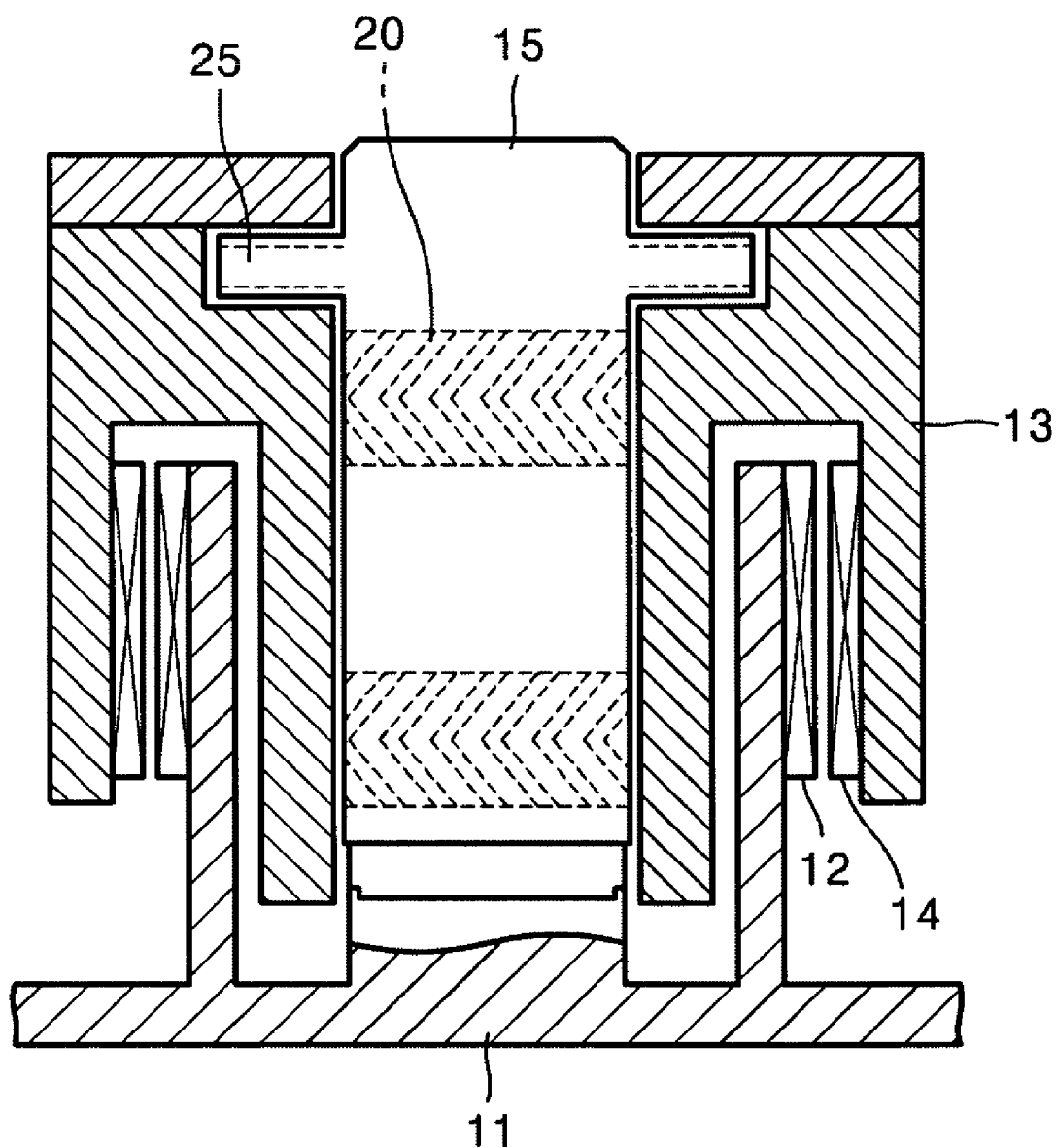
FIG. 1 is a view illustrating a conventional spindle motor for a hard disk drive.
Figure 2:
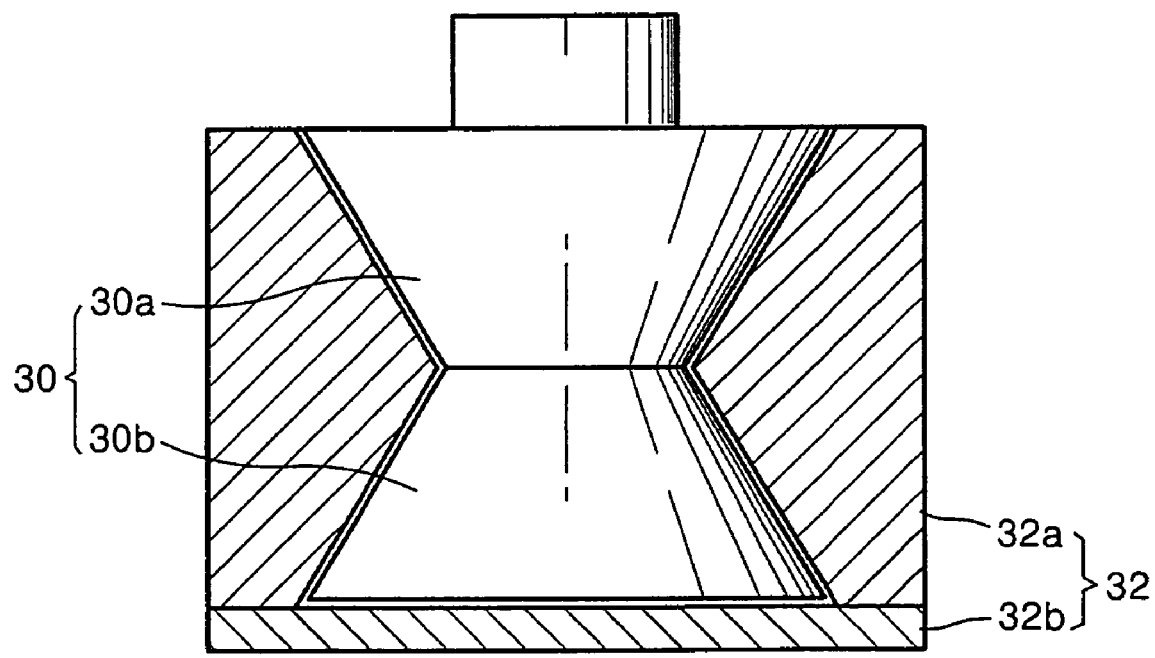
FIG. 2 is a view illustrating a conventional bearing structure.
Figure 3:
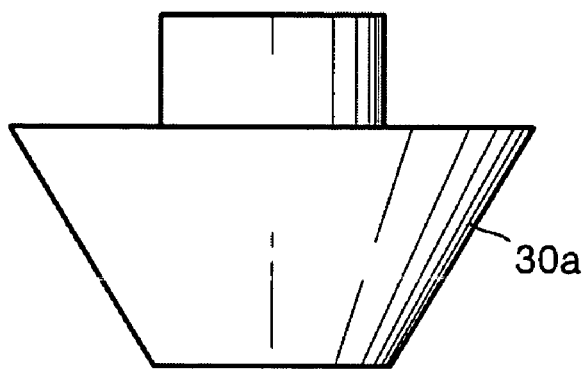
FIG. 3 is an exploded view of the conventional bearing structure.
Figure 3:
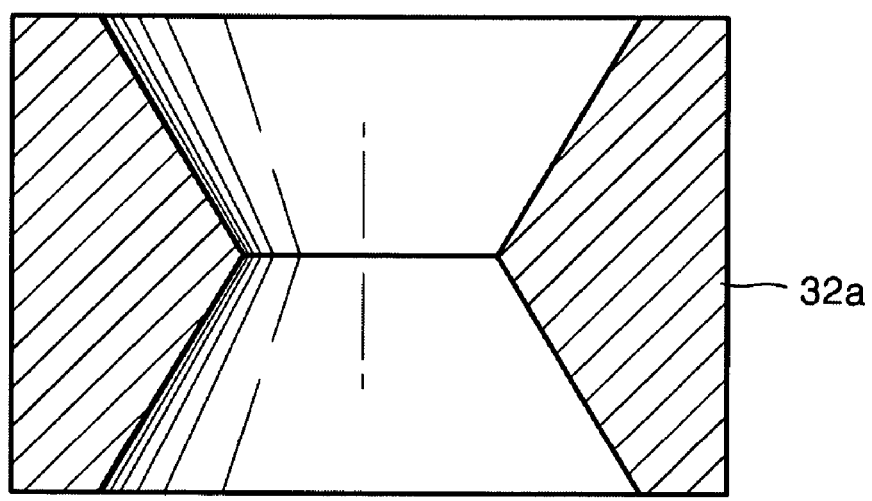
Figure 3:
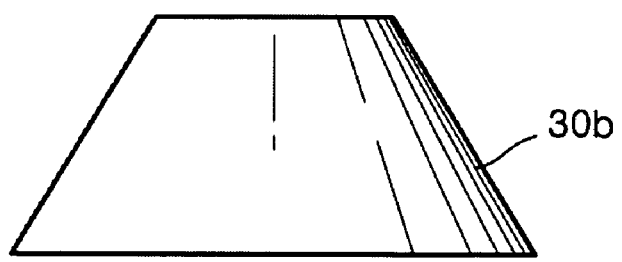
Figure 3:
Figure 4A:
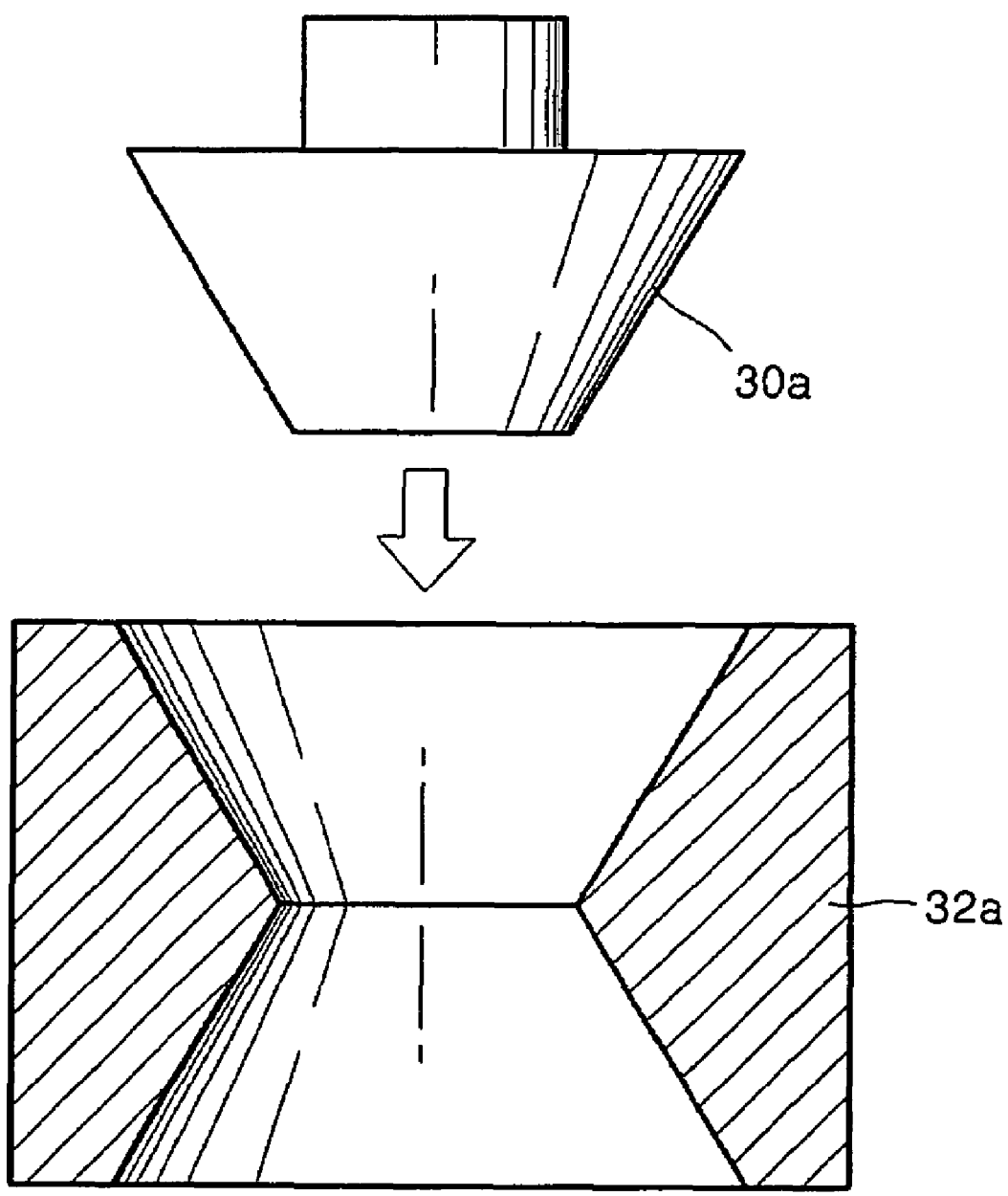
FIGS. 4A through 4C are views for explaining an assembly process of the bearing structure of FIG. 2.
Figure 4B:
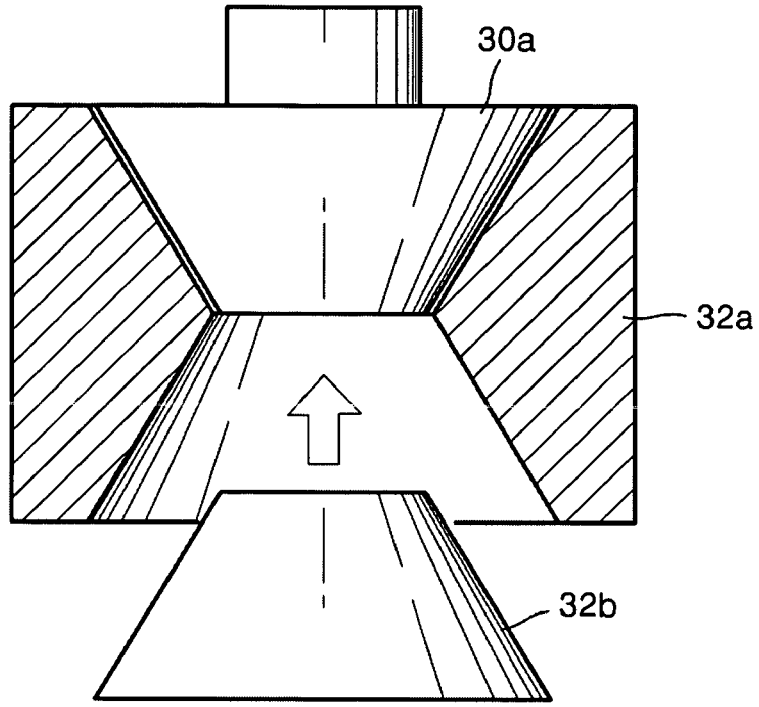
Figure 4C:
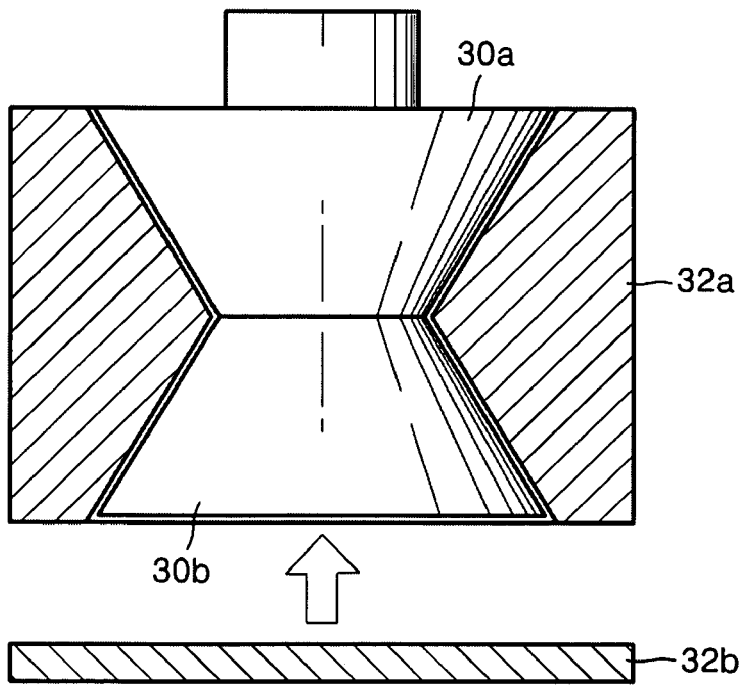
Figure 5:
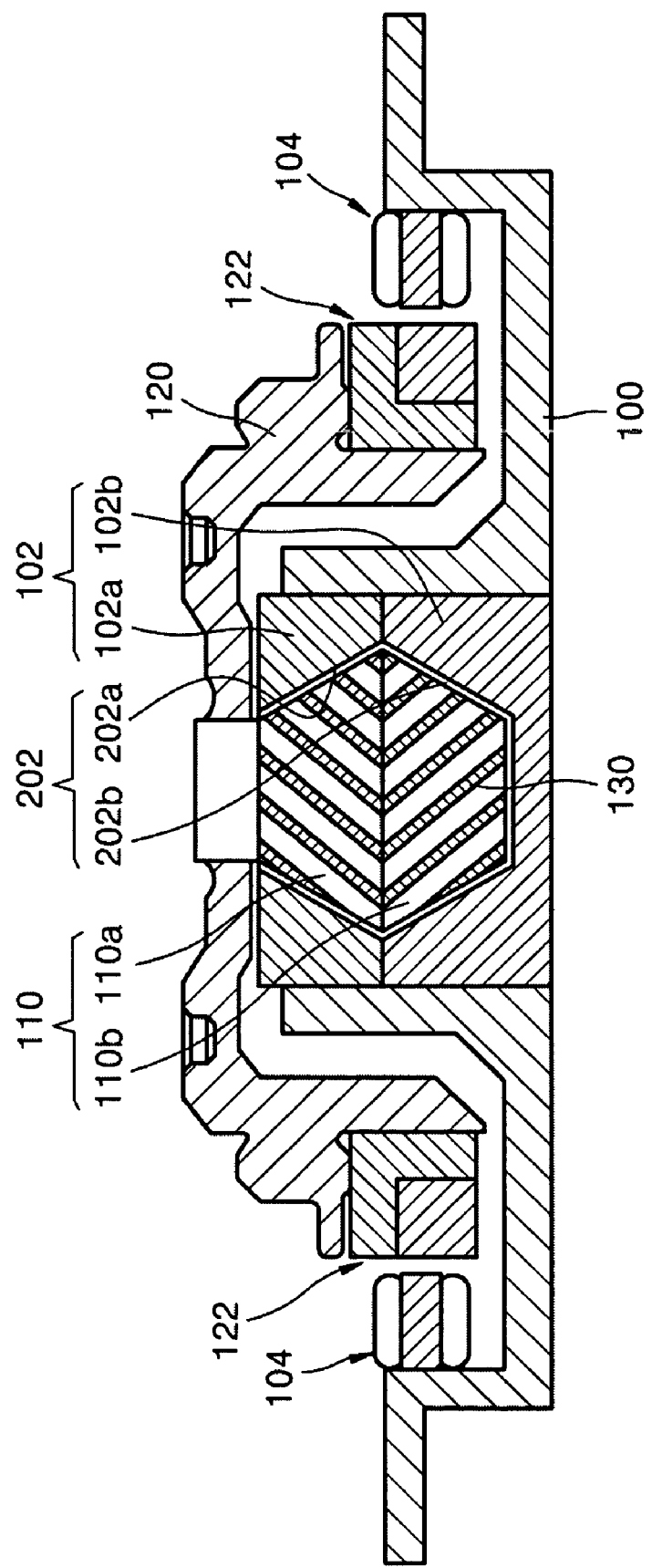
FIG. 5 is a view illustrating a spindle motor for a hard disk drive according to an embodiment of the present invention.

In the following descriptions, the same reference numerals indicate the same constituent elements. Referring to FIG. 5, a spindle motor for a hard disk drive according to an embodiment of the present invention includes a base 100, a sleeve 102, and a shaft 110. A stator 104 having a core and a coil which is provided at both sides of the base 100. The sleeve 102 is fixedly installed on the base 100 and a center hole portion 202 into which the shaft 110 is inserted is formed at a center portion of the sleeve 102. The sleeve 102 has first and second sleeves 102a and 102b which are coupled together in a vertical direction. The sleeve 102 is preferably formed of ceramic for bearing, such as, alumina or zirconia, exhibiting high wear resistance and impact resistance features.

The shaft 110 is rotatably installed in the center hole portion 202 of the sleeve 102 and has a shape such that the diameter thereof decreases from the middle portion of the shaft 110 in the lengthwise direction to both ends thereof. The shaft 110 includes first and second conic shafts 110a and 110b having a conic inclined surface which are coupled together in a vertical direction. The shaft 110 may be integrally formed. The shaft 110 is preferably formed of ceramic for bearings, such as, alumina or zirconia, exhibiting high wear resistance and impact resistance features. A first center hole portion 202a having a shape corresponding to the first conic shaft 110a is formed at the center portion of the first sleeve 102a. A second center hole portion 202b having a shape corresponding to the second conic shaft 110b is formed at the center portion of the second sleeve 102b.

A bearing gap to prevent friction with the sleeve 102 during rotation of the shaft 110 is formed between the outer circumferential surface of the shaft 110 and the inner circumferential surface of the sleeve 102. The bearing gap is filled with a lubricating fluid. The size of the bearing gap is between 1-2 μm. The lubricating fluid separates the shaft 110 from the sleeve 102 so that the shaft 110 can rotate without contacting the sleeve 102. Accordingly, a non-repeatable runout (NRRO) having a bad effect on recording and reproduction of a hard disk is not generated. In the present embodiment, air is used as the lubricating fluid, which can reduce a frictional loss and a starting torque and minimize a change of a bearing characteristic according to a temperature.

Figure 6A:
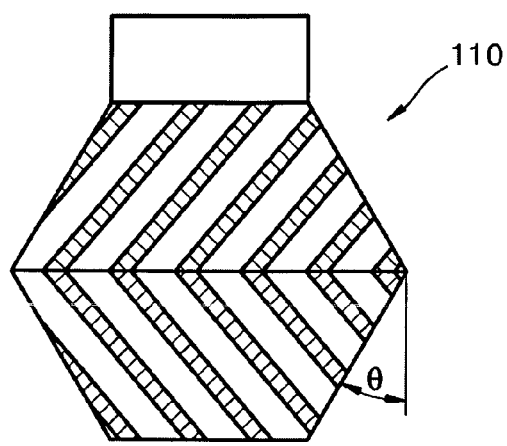
FIGS. 6A and 6B are a view and a graph, respectively, for showing a change of loads of an aerodynamic bearing in the axial and radial directions according to an inclination angle of an outer circumferential surface of a shaft.
Figure 6B:
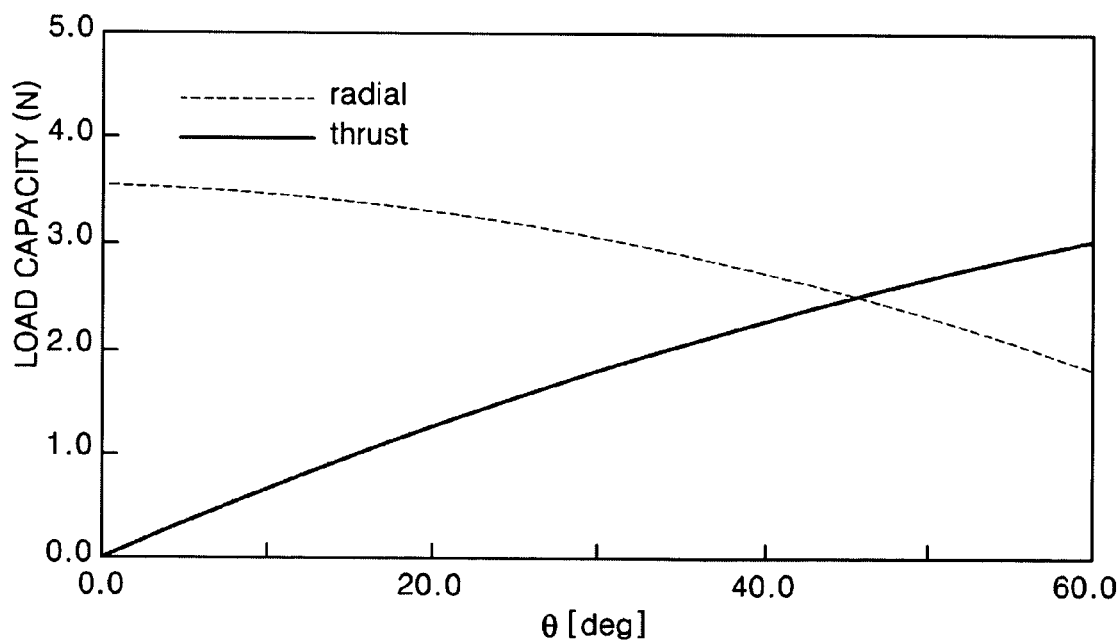

Thus, since the shaft 110 has a shape such that the diameter thereof decreases from the middle portion of the shaft 110 in a lengthwise direction to both ends thereof, an aerodynamic pressure bearing formed by the shaft 110 and the sleeve 102 can simultaneously support loads in the radial and axial directions. FIGS. 6A and 6B show a change in load capacities of an aerodynamic bearing in the axial and radial directions according to an inclination angle θ of an outer circumferential surface of the shaft 110 in the spindle motor for a hard disk drive according to the embodiment of the present invention.

A hub 120 where a disc is placed is coupled to an upper portion of the shaft 110. A rotator 122 having a magnet and a yoke is provided at a lower portion of both sides of the hub 120 to correspond to the stator 104. The stator 104 and the rotator 122 generate an electromagnetic force by an interaction therebetween to rotate the shaft 110.

Figure 7:
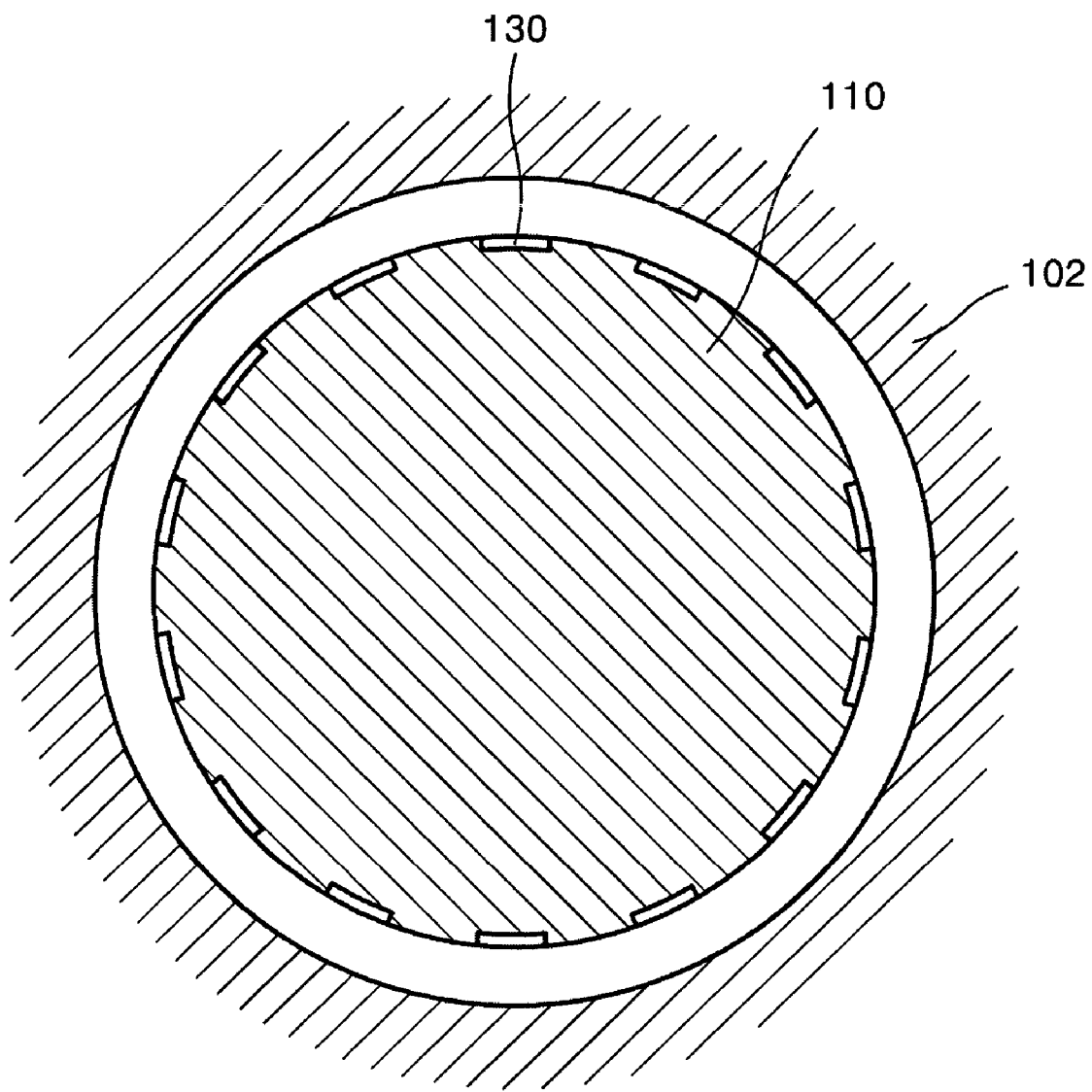
FIG. 7 is a sectional view for showing grooves which are formed in the outer circumferential surface of the shaft.
Figure 8:
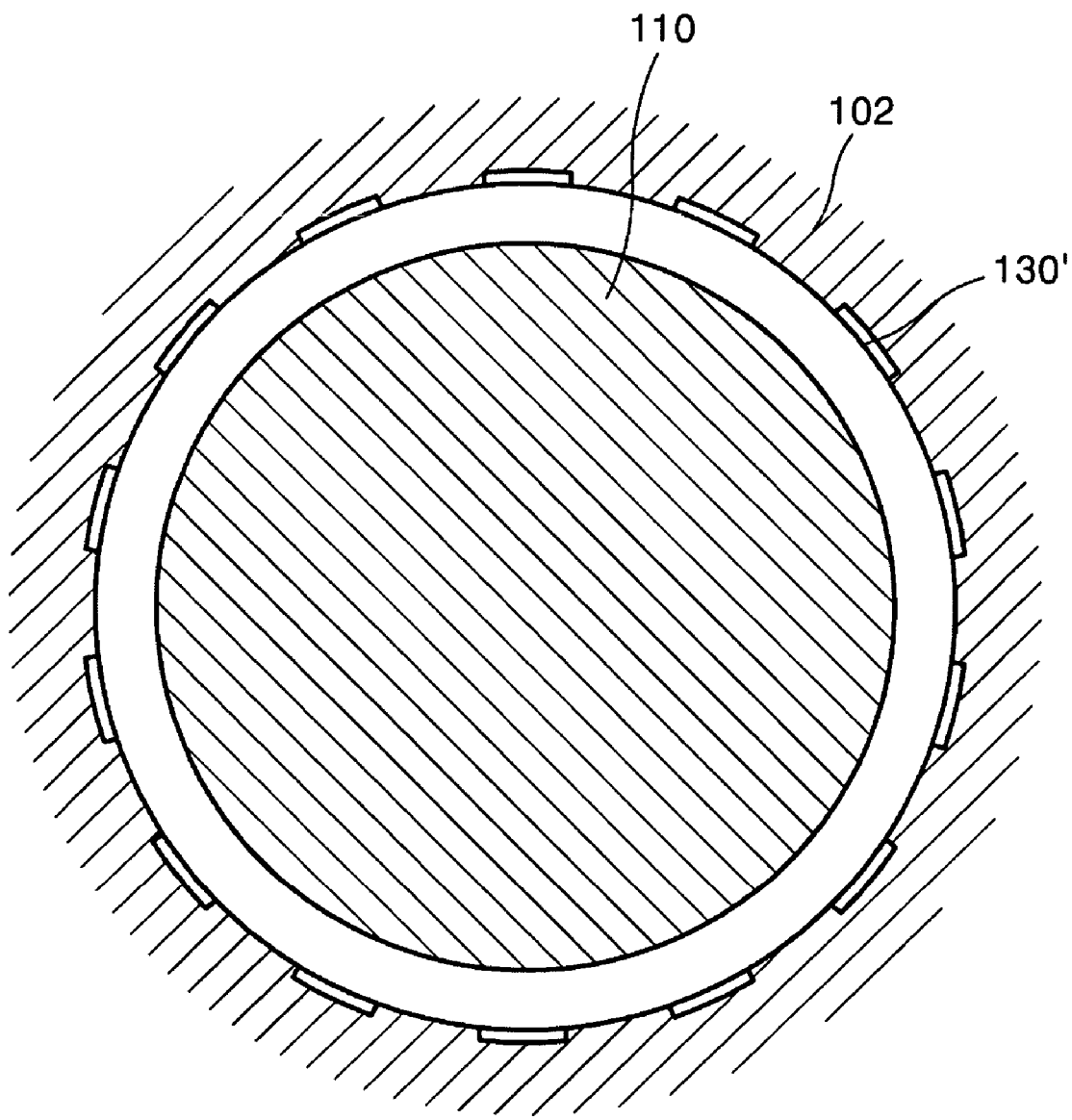
FIG. 8 is a sectional view for showing grooves which are formed in the inner circumferential surface of a sleeve.

A plurality of grooves 130 to generate aerodynamic pressure are formed in an outer circumferential surface of the shaft 110 in a herringbone pattern. FIG. 7 shows the sections of the grooves 130 formed in the outer circumferential surface of the shaft 110. Referring to FIG. 7, the section of each of the grooves 130 is rectangular. When the grooves 130 are formed in the outer circumferential surface of the shaft 110 in the herringbone pattern, a high stiffness and a large load capacity can be obtained in the operation range at a high speed due to a pumping effect of the lubricating fluid and rotational stability can be obtained as well. As shown in FIG. 8, the grooves 130 in the herringbone pattern can be formed in the inner circumferential surface of the sleeve 102.

Figure 9:
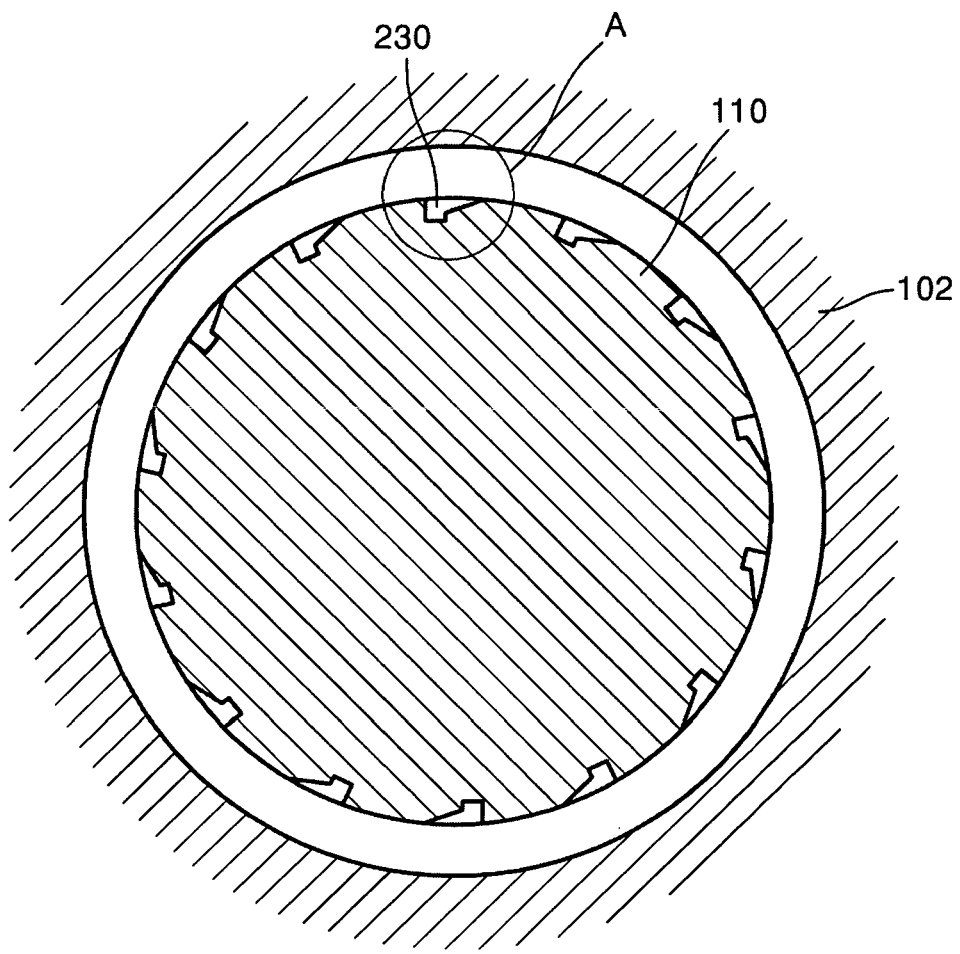
FIG. 9 is a sectional view for showing grooves having different sectional shapes which are formed in the outer circumferential surface of the shaft.
Figure 10:
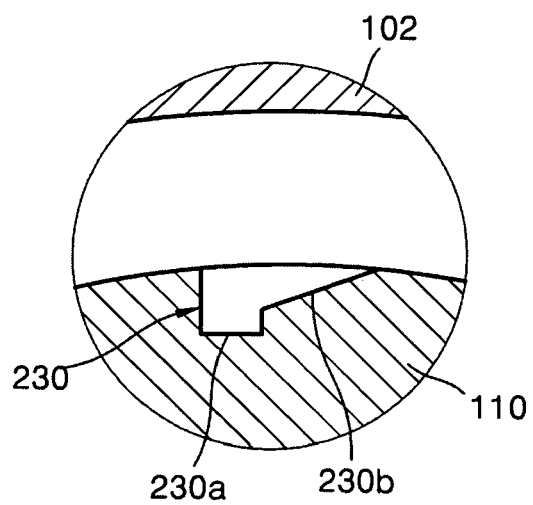
FIG. 10 is a magnified sectional view of a portion A of FIG. 9.
Figure 11:
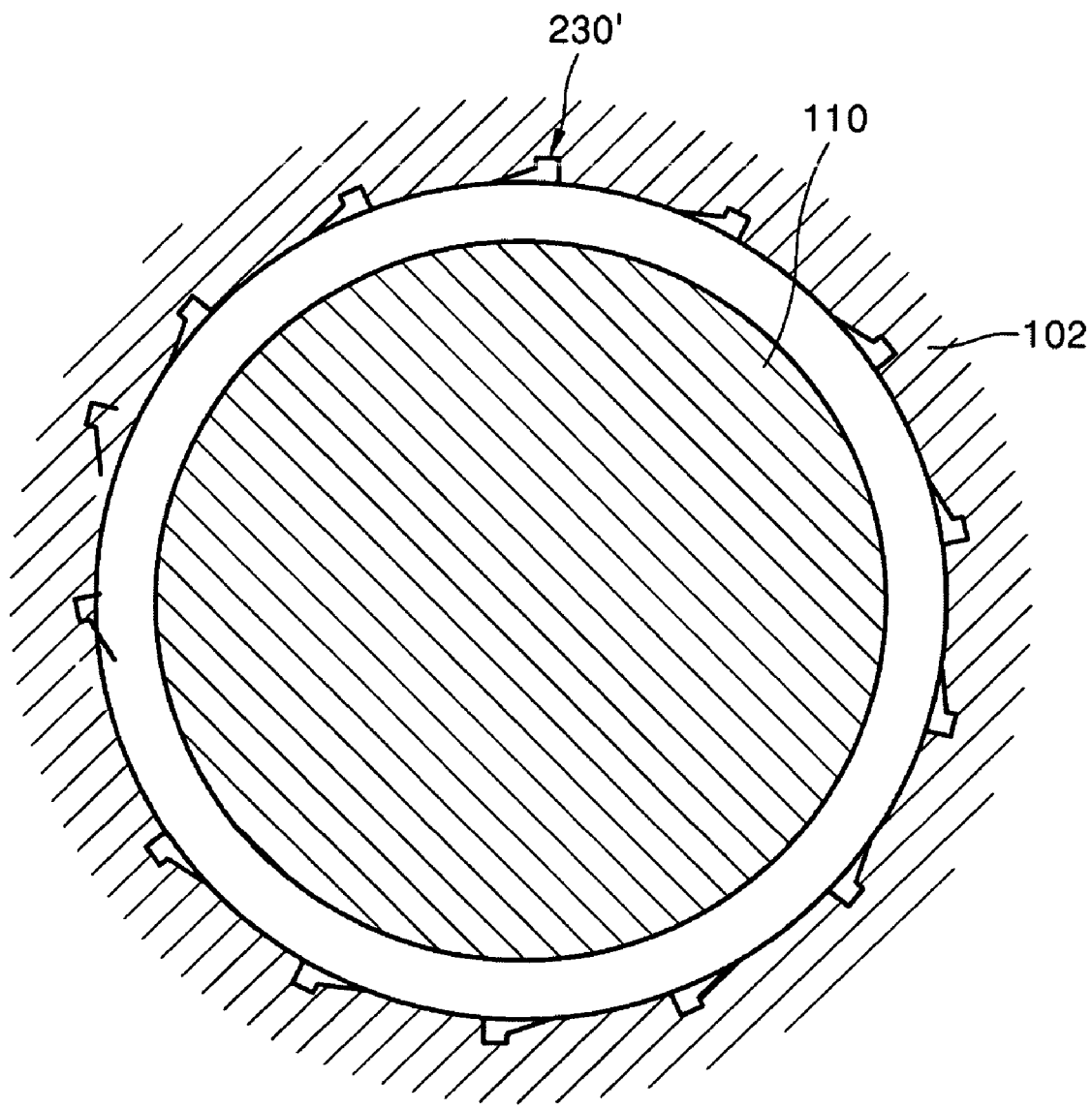
FIG. 11 is a sectional view for showing grooves formed in the inner circumferential surface of the sleeve and having different shapes.

FIG. 9 shows grooves having different sectional shapes from those of the grooves 130 of FIG. 7, which are formed in the outer circumferential surface of the shaft. FIG. 10 is a magnified sectional view of a portion A of FIG. 9. Referring to FIGS. 9 and 10, a plurality of grooves 230 are formed in a taper-flat sectional shape in which the section of each of the grooves 230 has an inclined portion 230b which extends from a lower portion 230a to be inclined. When the grooves 230 are formed in a taper-flat sectional shape, not only the pumping effect of fluid due to the grooves 230 in the herringbone pattern, but also a wedge effect due to the inclined portion 230b of the grooves 230, can be obtained. Accordingly, a high stiffness and a large load capacity can be obtained in the operation range from a lower speed to a high speed and a high rotational stability can be obtained as well. As shown in FIG. 11, the grooves 230 in the taper-flat sectional shape can be formed in the inner circumferential surface of the sleeve 102.

Figure 12A:
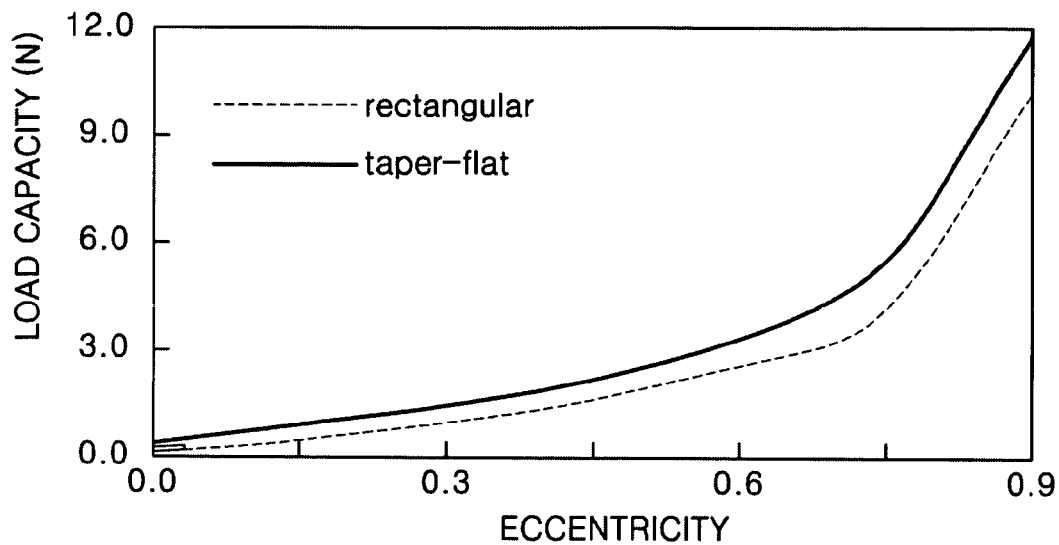
FIGS. 12A and 12B are graphs for showing the result of comparison of load capacities of aerodynamic bearings having a rectangular sectional shape and a taper-flat sectional shape, respectively.
Figure 12B:
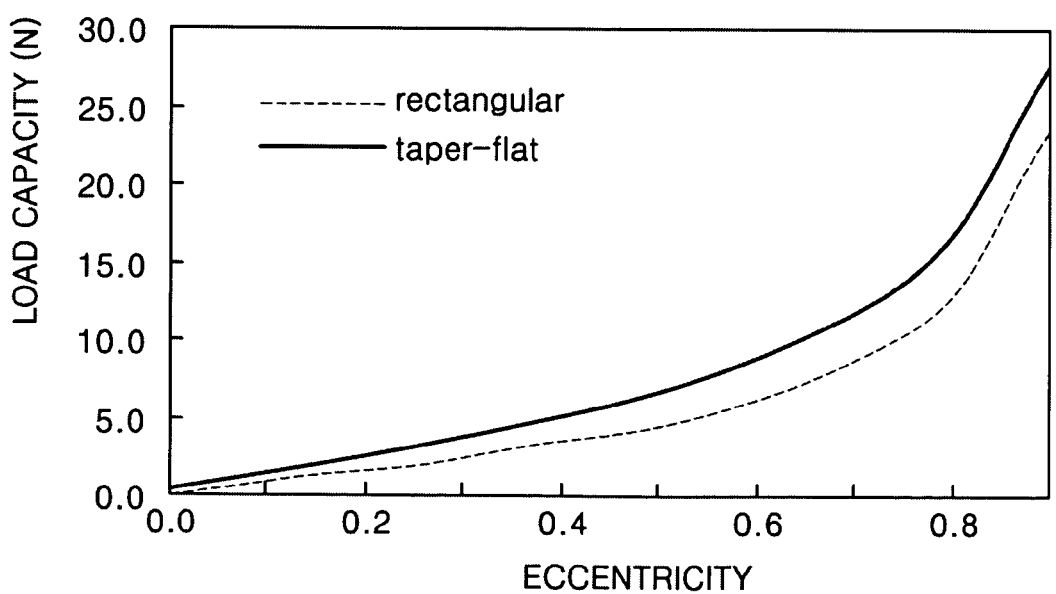

FIGS. 12A and 12B are graphs for showing the relationship between eccentricity and load capacity of aerodynamic bearings having a rectangular sectional shape and a taper-flat sectional shape, respectively. The results are obtained by calculating a Reynolds equation that is a lubrication equation with respect to each bearing in a finite difference method (FDM). In FIG. 12A, a rotation speed is 10,000 rpm and a bearing gap is 2 µm while in FIG. 12B the rotation speed is 15,000 rpm and the bearing gap is 1 µm. Referring to FIGS. 12A and 12B, the aerodynamic bearing having a taper-flat sectional shape has a larger load capacity throughout a range not more than 15,000 rpm which is the operation area of a typical hard disk drive.

Figure 13:
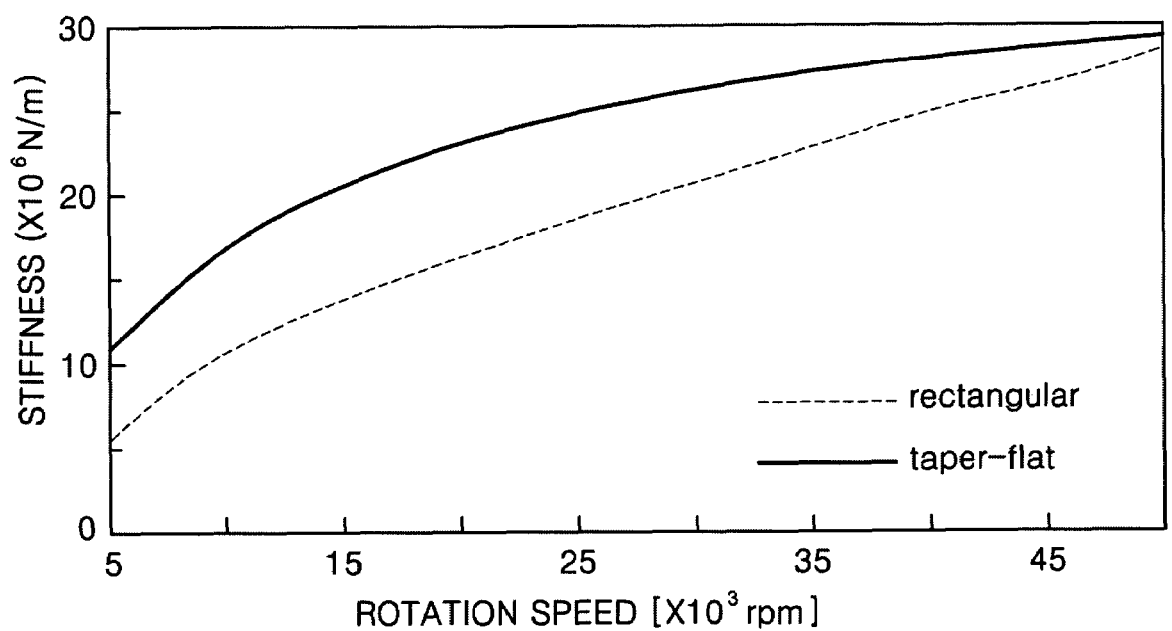
FIG. 13 is a graph for showing the result of comparison of stiffness of aerodynamic bearings having a rectangular sectional shape and a taper-flat sectional shape, according to the rotation speed.

FIG. 13 is a graph for showing the result of comparison of stiffness of aerodynamic bearings having a rectangular sectional shape and a taper-flat sectional shape, according to the rotation speed. The results are obtained by calculating the Reynolds equation that is a lubrication equation with respect to each bearing in the finite difference method (FDM). Here, the bearing gap is 1 µm. Referring to FIG. 13, the aerodynamic bearing having a taper-flat sectional shape exhibits a higher stiffness.

Table 1 shows a change in stiffness in a radial direction according to an operation temperature of an aerodynamic bearing having a taper-flat sectional shape according to the present invention and the conventional hydrodynamic bearing. Table 2 shows a frictional loss according to an operation temperature of an aerodynamic bearing having a taper-flat sectional shape according to the present invention and the conventional hydrodynamic bearing. Tables 1 and 2 are the result of calculation of the Reynolds equation that is a lubrication equation with respect to each bearing in the finite difference method (FDM).

TABLE 1

| Temperature (° C.) | 20 | 60 | Change rate (%) |
|---|---|---|---|
| Stiffness of hydrodynamic bearing (N/mm) | 1054.2 | 339.07 | −67.8 |
| Stiffness of aerodynamic bearing (N/mm) | 31.95 | 35.66 | +11.6 |

TABLE 2

| Temperature (° C.) | 20 | 60 |
|---|---|---|
| Friction loss of hydrodynamic bearing (mW) | 17.5 | 6.01 |
| Friction loss of aerodynamic bearing (mW) | 0.0441 | 0.04876 |

First, referring to Table 1, as the operation temperature increase from 20° C. to 60° C., the stiffness of the conventional hydrodynamic bearing decreases by 67.8% while the stiffness of the aerodynamic bearing according to the present invention increases by 11.6%. Accordingly, since the aerodynamic bearing according to the present invention shows a little change in stiffness according to the change in temperature, the natural frequency of a motor according to the change in temperature changes slightly. Thus, a spindle motor using the aerodynamic bearing according to the present invention exhibits a higher reliability to accuracy in rotation according to a change in the operation temperature than a spindle motor using the conventional hydrodynamic bearing.

Next, referring to Table 2, the friction loss of the aerodynamic bearing according to the present invention is 0.252% of the friction loss of the conventional hydrodynamic bearing at 20° C. and 0.810% of the friction loss of the conventional hydrodynamic bearing at 60° C. Thus, since the friction loss of the aerodynamic bearing according to the present invention is remarkably lower than that of the conventional hydrodynamic bearing, power consumption and starting torque decrease greatly.

Figure 14:
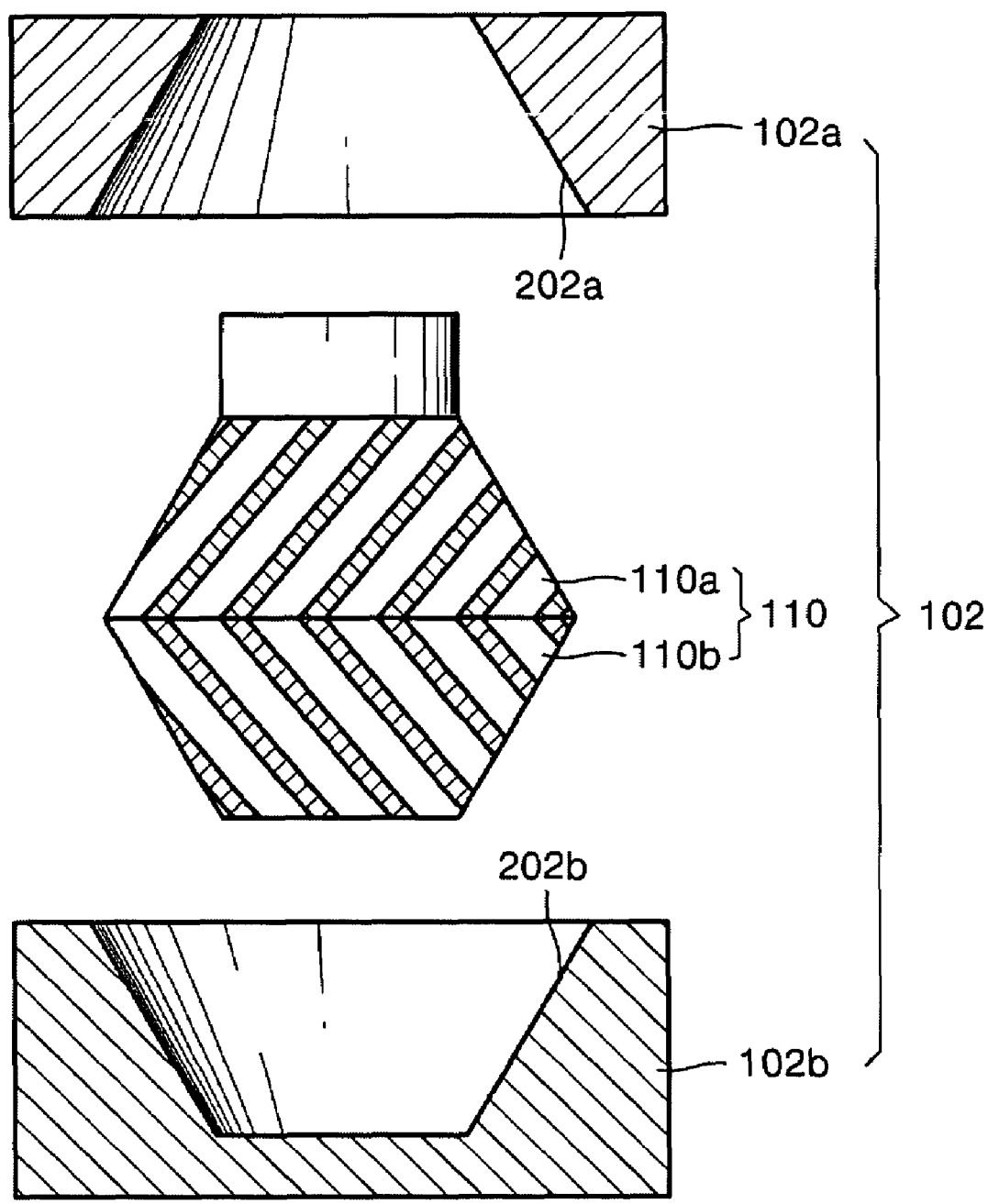
FIG. 14 is an exploded view illustrating the shaft and the sleeve of the spindle motor for a hard disk drive of FIG. 5.

FIG. 14 is an exploded view illustrating the shaft and the sleeve of the spindle motor for a hard disk drive of FIG. 5. Referring to FIG. 14, a shaft 110 includes first and second conic shafts 110a and 110b having conic inclined surfaces which are coupled up and down together. The shaft 110 can be processed and formed integrally. First and second sleeves 102a and 102b are assembled up and down with respect to the shaft 110. A first space portion 202a having a shape corresponding to the first conic shaft 110a is formed in the first sleeve 102a. A second space portion 202b having a shape corresponding to the second conic shaft 110b is formed in the second sleeve 102b. Thus, in the spindle motor for a hard disk according to the embodiment of the present invention, a sleeve 102 may include at least two parts and the shaft 110 may include at least one part.

Figure 15A:
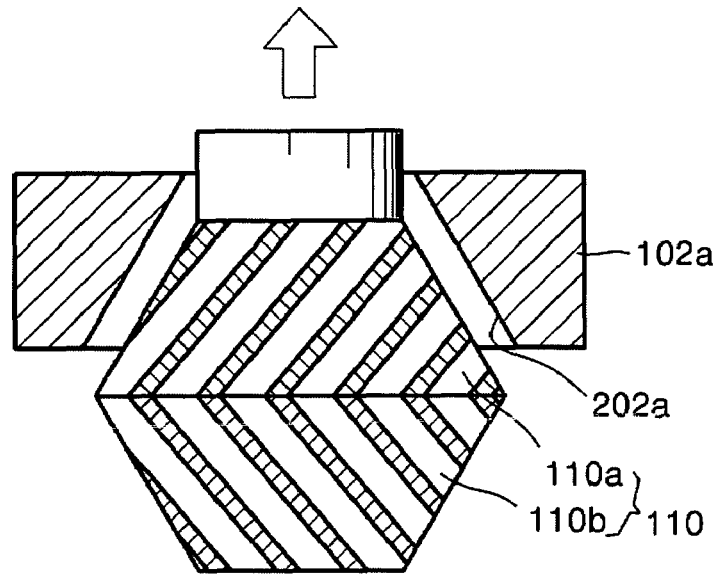
FIGS. 15A and 15b are views for explaining the assembly steps of the shaft and the sleeve of the spindle motor for a disk drive of FIG. 5.
Figure 15B:
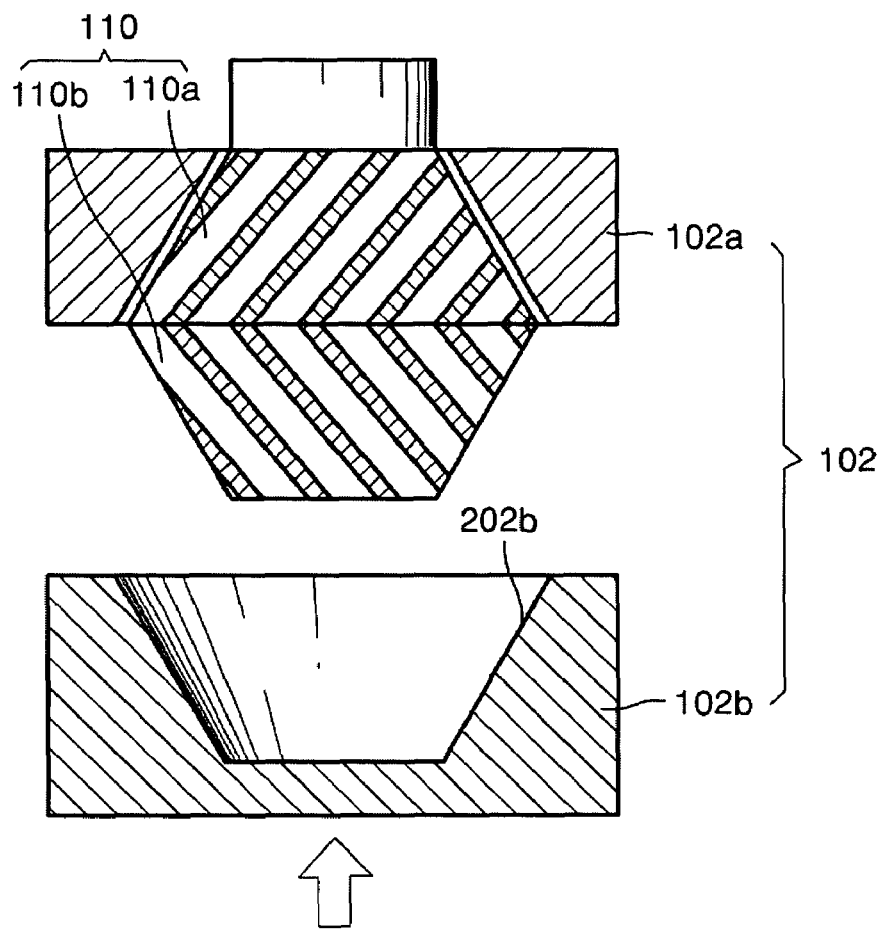

FIGS. 15A and 15b are views for explaining the assembly steps of the shaft and the sleeve of the spindle motor for a disk drive of FIG. 5. In order to assemble the shaft 110 and the sleeve 102, first, as shown in FIG. 15A, the first conic shaft 110a of the shaft 110 is inserted in the first sleeve 102a where the first space portion 202a is formed, in a direction indicated by an arrow. Then, as shown in FIG. 15B, the second sleeve 102b is assembled to the first sleeve 102a in a direction indicated by an arrow so that the second conic shaft 110b of the shaft 110 is inserted in the second space portion 202b. Thus, in the spindle motor for a hard disk according to the embodiment of the present invention, the shaft 110 and the sleeve 102 can be assembled in at least two assembly steps.

As described above, the spindle motor for a hard disk according to the present embodiment of the present invention has the follows merits.

First, since the shaft has a shape such that a diameter thereof decreases from the middle portion of the shaft in a lengthwise direction to both ends thereof, the bearing formed by the shaft and the sleeve can simultaneously support a load in a radial direction and a load in an axial direction.

Second, since the aerodynamic bearing is used, the friction loss and the starting torque can be reduced. Also, the change in characteristic of the bearing according to a change in temperature can be minimized.

Third, since a plurality of grooves in a herringbone pattern are formed in the outer circumferential surface of the shaft, a high stiffness and a large load capacity can be obtained in the operation range from a lower speed to a high speed and a high rotational stability can be obtained as well.

Fourth, since the shaft can be formed integrally, processing and assembly features are improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A spindle motor for a disk drive comprising:
   a base;
   a sleeve fixed on the base and having a space portion therein;
   a shaft rotatably installed in the space portion of the sleeve and having a shape such that a diameter of the shaft decreases from a middle portion of the shaft in a lengthwise direction to both ends thereof, wherein a bearing gap generated between an outer circumferential surface of the shaft and an inner circumferential surface of the sleeve is filled with air, and
   a first plurality of grooves formed in an outer circumferential surface of a first portion of the shaft, the first portion defined between one end of the shaft and the middle portion, and a second plurality of grooves formed in the outer circumferential surface of a second portion of the shaft, the second portion defined between the other end of the shaft and the middle portion, wherein each groove of the first plurality of grooves extends in a different direction than each of groove of the second plurality of grooves, and each groove of the first plurality of grooves intersects a groove of the second plurality of grooves at the middle portion.

2. The spindle motor as claimed in claim 1, wherein the shaft is formed by coupling first and second conic shafts having conic inclined surfaces.

3. The spindle motor as claimed in claim 2, wherein the shaft is integrally formed.

4. The spindle motor as claimed in claim 2, wherein the sleeve comprises a first sleeve where a first space portion having a shape corresponding to the first conic shaft and a second sleeve where a second space portion having a shape corresponding to the second conic shaft.

5. The spindle motor as claimed in claim 2, wherein the sleeve comprises a first sleeve having a first space portion corresponding to the first conic shaft and a second space portion corresponding to the second conic shaft, such that the bearing gap is formed between the respective conic shafts and space portions for applying a pressure bearing to the shaft.

6. The spindle motor as claimed in claim 1, wherein the plurality of grooves are formed in a herringbone.

7. The spindle motor as claimed in claim 6, wherein a sectional shape of each of the grooves is rectangular.

8. The spindle motor as claimed in claim 6, wherein a sectional shape of each of the grooves is taper-flat such that one side surface is inclined from a lower surface portion.

9. The spindle motor as claimed in claim 1, wherein the sleeve is formed of ceramic.

10. The spindle motor as claimed in claim 9, wherein the ceramic is alumina or zirconia.

11. The spindle motor as claimed in claim 1, wherein the shaft is formed of ceramic.

12. The spindle motor as claimed in claim 11, wherein the ceramic is alumina or zirconia.

13. The spindle motor as claimed in claim 1, wherein the shaft has a maximum diameter at the middle portion.

14. A spindle motor for a disk drive comprising:
   a base;
   a sleeve fixed on the base and having a space portion therein;
   a shaft rotatably installed in the space portion of the sleeve and having a shape such that a diameter of the shaft decreases from a middle portion of the shaft in a lengthwise direction to both ends thereof;
   a plurality of grooves in a herringbone pattern formed on inclined outer circumferential surfaces of the shaft or inner circumferential surfaces of the sleeve opposing the inclined outer circumferential surfaces, wherein the herringbone pattern is formed by at least two grooves of the plurality of grooves intersecting one another at a central portion of the respective shaft or sleeve; and
   wherein a bearing gap generated between an outer circumferential surface of the shaft and an inner circumferential surface of the sleeve is filled with air.

15. The spindle motor as claimed in claim 14, wherein the inclined outer circumferential surfaces are conic.

16. A spindle motor for a disk drive comprising:
   a base;
   a sleeve fixed on the base and having an inner circumferential surface defining space portion therein;
   a shaft rotatably installed in the space portion of the sleeve and having a shape such that a diameter of the shaft decreases from a middle portion of the shaft in a lengthwise direction to both ends thereof; and
   a bearing gap formed by opposing inclined surfaces of the shaft and sleeve, wherein the bearing gap provides an aerodynamic pressure bearing to the shaft,
   wherein the aerodynamic pressure is supplied by a first and second plurality of grooves formed on the shaft, each groove of the first plurality of grooves extends in a first direction, each groove of the second plurality of grooves extends in a second direction, different from the first direction, and each groove of the first plurality of grooves intersects a groove of the second plurality of grooves at the middle portion.

17. The spindle motor as claimed in claim 16, wherein the bearing gap provides both an axial and radial pressure bearing at a lengthwise station of the shaft.

18. The spindle motor as claimed in claim 16, wherein the opposing inclined surfaces are conic inclined surfaces.

19. The spindle motor as claimed in claim 16, further including a first and second pair of opposing inclined surfaces that extend from the middle portion of the shaft to both ends thereof.

* * * * *